United States Patent
Thubert et al.

(10) Patent No.: US 12,155,622 B1
(45) Date of Patent: Nov. 26, 2024

(54) VIRTUAL SERVER ADDRESS SELECTION

(71) Applicant: Cisco Technology, Inc., San Jose, CA (US)

(72) Inventors: Pascal Thubert, Roquefort les Pins (FR); Eric A. Voit, Bethesda, MD (US); Eric Levy-Abegnoli, Valbonne (FR); Patrick Wetterwald, Mouans Sartoux (FR); Jonas Zaddach, Antibes (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/237,590

(22) Filed: Aug. 24, 2023

(51) Int. Cl.
*H04L 61/5007* (2022.01)
*H04L 9/40* (2022.01)
*H04L 61/2503* (2022.01)
*H04L 61/4511* (2022.01)

(52) U.S. Cl.
CPC ...... *H04L 61/5007* (2022.05); *H04L 61/2503* (2013.01); *H04L 61/4511* (2022.05); *H04L 63/04* (2013.01)

(58) Field of Classification Search
CPC .... H04L 9/40; H04L 67/1001; H04L 67/1008
See application file for complete search history.

(56) References Cited

U.S. PATENT DOCUMENTS

| | | | |
|---|---|---|---|
| 9,807,016 B1 | 10/2017 | Sarangapani et al. | |
| 10,530,803 B1* | 1/2020 | Palle | H04L 63/0861 |
| 2006/0182103 A1* | 8/2006 | Martini | H04L 63/0428 |
| | | | 370/389 |
| 2013/0297596 A1 | 11/2013 | Mouline et al. | |
| 2017/0374088 A1 | 12/2017 | Pappu et al. | |
| 2021/0144120 A1* | 5/2021 | Wang | H04L 61/5061 |
| 2021/0352045 A1 | 11/2021 | Kodavanty | |
| 2023/0155978 A1 | 5/2023 | Thubert et al. | |

* cited by examiner

Primary Examiner — Chirag R Patel
(74) Attorney, Agent, or Firm — Lee & Hayes, P.C.

(57) ABSTRACT

Techniques for varying locations of virtual networks associated with endpoints using Network Address Translation (NAT), Mobile Internet Protocol (MIP), and/or other techniques in conjunction with Domain Name System (DNS). Rather than having DNS provide a client device with an IP address of an endpoint device, such as a server, the DNS instead returns a virtual IP (VIP) address that is mapped to the client device and the endpoint device. The VIP address may be selected based on a number of factors (e.g., power usage, privacy requirements, virtual distances, etc.). In this way, IP addresses of servers are obfuscated by a virtual network of VIP addresses that can be periodically rotated and/or load balanced. The client device may then communicate data packets to the server using the VIP address as the destination address, and a virtual network service that works in conjunction with DNS can convert the VIP address to the actual IP address of the server using NAT and forward the data packet onto the server.

20 Claims, 9 Drawing Sheets

VIRTUAL SERVER ADDRESS SELECTION

TECHNICAL FIELD

The present disclosure relates generally to anonymizing addresses of endpoints, such as servers, in traffic communicated from source devices.

BACKGROUND

Networks such as the Internet use the Domain Name System (DNS) to essentially provide mappings between human-readable domain names (e.g., website addresses, service addresses, etc.) that client devices are seeking and the actual Internet Protocol (IP) addresses for devices hosting the websites or providing the services. Generally, client devices send DNS queries to resolve domain names to a DNS server, and the DNS server then resolves the domain names to the corresponding IP addresses and sends DNS responses to the client devices that include the IP addresses. The client devices are then able to communicate data packets with the desired website or service using the IP address of the device(s) supporting the website or service.

Client devices often send information in data packets that is sensitive or private, and when the data packets are sent over public networks, the information in those packets can be viewed by potentially malicious entities. Accordingly, various types of encryption protocols (e.g., Hypertext Transfer Protocol Secure (HTTPS)) are used to communicate data packets over networks such that the payload of the data packets is encrypted to prevent entities from discerning sensitive information. However, the headers of the data packets are often unencrypted because information in the headers are often needed to make networking decisions. For instance, destination IP addresses are used to make routing decisions such that the data packets reach the correct destinations, source IP addresses can be used to make firewall decisions to drop or allow packets, and so forth. However, client devices may further desire that information in the headers is obfuscated as well from potentially malicious entities, such as the source address.

In light of this, there have been large efforts to develop techniques to anonymize the client devices' IP addresses (and/or other information such as Media Access Control (MAC) addresses) to protect the privacy of users. However, the destination addresses in the packets are generally still visible because they need to be used for networking decisions, such as routing decisions. Various issues arise due to the visibility of the IP addresses shown in the destination address field. For instance, once the address of the destination device (e.g., server, endpoint, etc.) is known to a malicious entity, the address can be used for direct attacks on the destination device (e.g., distributed denial-of-service (DDOS) attacks). It can be very difficult to discriminate legitimate traffic to the servers from attacks. Additionally, malicious entities may be able to observe where the client devices are sending traffic, or which sites they are consulting. If the malicious entities are close to the client device, the malicious entities may be able to correlate the client device and server, thereby eliminating privacy of the client device. Thus, destination devices, such as servers or other endpoints, are vulnerable to various attacks by malicious entities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
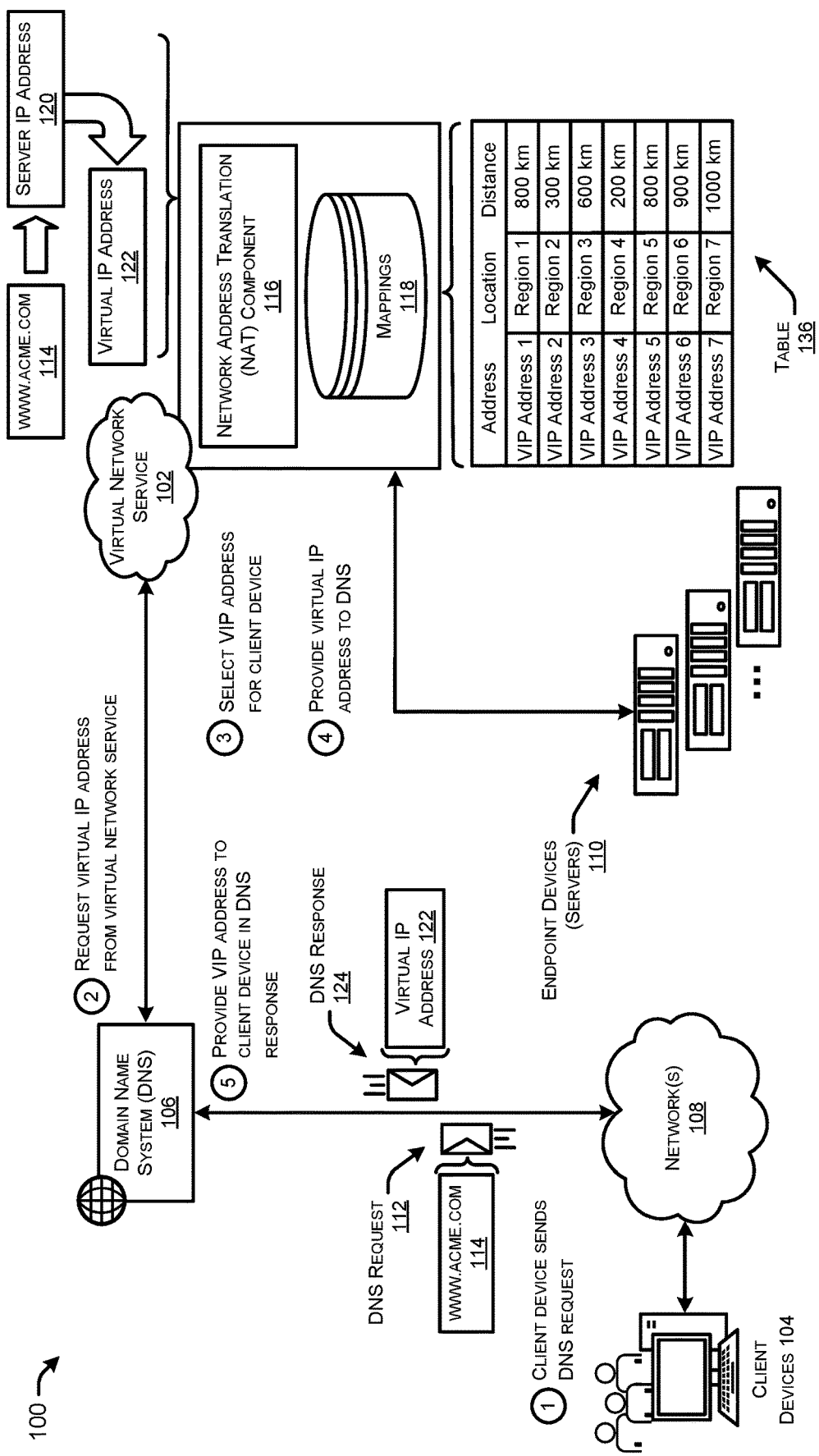
FIG. 1A illustrates a system-architecture diagram of a virtual network service that maps virtual IP (VIP) addresses to IP addresses of endpoints devices such that a DNS server can provide client devices with respective VIP addresses that are usable to reach the endpoint devices.

This disclosure describes techniques for using MIPv6, NAT, LISP, and/or other techniques in conjunction with DNS to anonymize server-side addresses in data communications.

A first method to perform techniques described herein includes mapping an Internet Protocol (IP) address of an endpoint (e.g., server) to a group of virtual IP (VIP) addresses, such as allocating as block of VIP prefixes for the IP of the server. The first method may further include receiving a DNS request to resolve a domain name on behalf of a client device. The first method may further include determining at least one privacy requirement associated with the endpoint. The first method may further include selecting a first VIP address from the group of VIP addresses to provide to the client device based at least in part on the privacy requirement and providing the first VIP address for use by the client device to contact the endpoint.

In some instances, the first method may further include receiving a packet having a destination address that is the first VIP address, determining that a source address of the packet is a source IP address of the client device sent the packet, performing Network Address Translation (NAT) by changing the destination address of the packet from the first VIP address to the IP address of the endpoint, and sending the packet to a next hop associated with the IP address of the endpoint. The method of claim 1 may be performed by a system and/or device that includes a DNS server or is associated with a DNS server.

In some instances, the techniques described herein include a second method. The second method may include mapping an IP address of an endpoint to a group of VIP addresses. The second method may further include receiving a DNS request to resolve a domain name on behalf of a client device. Further, the second method may include determining a power usage associated with the first VIP address. The second method may include selecting a first VIP address from the group of VIP addresses to provide to the client device based at least in part on the power usage and providing the first VIP address for use by the client device to contact the endpoint.

In some instances, the techniques described herein include a third method. The third method may include mapping an IP address of an endpoint to a group of VIP addresses. The second method may further include receiving a DNS request to resolve a domain name on behalf of a client device. Further, the third method may include identifying a first VIP address from the group of VIP addresses that was previously provided to the client device for communicating with the endpoint. The third method may include selecting a second VIP address from the group of VIP addresses to provide to the client device based at least in part on second first VIP address being different then the first VIP address and providing the second VIP address for use by the client device to contact the endpoint.

Additionally, the techniques described herein may be performed by a system and/or device having non-transitory computer-readable media storing computer-executable instructions that, when executed by one or more processors, performs the method described above.

EXAMPLE EMBODIMENTS

Generally, the address of a website that a client device visits is indicative of the location of the server and/or the cloud tenant that includes the server, and can be used to approximate the website that the client device is visiting. With Transport Layer Security (TLS), HTTPS, and the like, that is some of the only information available to an observer on path that may do operations like slowing or blocking some destinations, or use the information against the client in whichever fashion. While techniques have been developed to protect the source address of the client device, there are no techniques for protecting the address of the server, which is only partially hidden from public view by complex cloud architectures and load balancers.

The techniques described herein obfuscate the destination IP so additional aspects of the packet become private and varies the virtual network provided to the client device to make it difficult for an attacker to locate both the client device and the server.

This disclosure describes techniques for using NAT, MIP, LISP, and/or other techniques in conjunction with DNS to anonymize server-side addresses in data communications and select which virtual networks will be made accessible to a client device based on a number of factors (e.g., power usage, privacy requirements, virtual distances, load balancing, etc.). Rather than having DNS provide a client device with an IP address of an endpoint device, such as a server, a virtual network service selects a VIP address and instructs the DNS to return the VIP address that is mapped to the client device and the endpoint device. In this way, IP addresses of servers are obfuscated by a virtual network of geographically distributed VIP addresses that may be rotated to provide a better anonymization, among other benefits. The client device may then communicate data packets to the server using the VIP address as the destination address, and a virtual network service that works in conjunction with DNS can convert the VIP address to the actual IP address of the server using NAT and forward the data packet onto the server.

A client device may send a DNS request to a DNS server for the DNS server to translate or resolve a domain name (e.g., website name, service name, etc.) to an IP address that is usable to contact the domain name. Traditionally, the DNS server would simply resolve the domain into the IP address (and/or other contact information) registered for the server and return the IP address to the client device. However, according to the techniques described herein, a virtual network service may work in conjunction (and/or be included in) the DNS service to select a VIP address from a group of geographical distributed VIP addresses and provide VIP addresses on a client device-by-client device basis. That is, the virtual network service may associate a virtual network of IP addresses, or VIP addresses, for each IP address. As client devices request the DNS for the IP address of a particular server, the virtual network service and/or DNS may determine which VIP address should be provided based on a number of factors (e.g., power usage, privacy requirements, virtual distances, load balancing, etc.) and provide the selected VIP address mapped to the IP address to each client device, and store a mapping between each VIP address and the client device that received the VIP address. Thus, client devices may request that DNS provide them with an IP address for a particular server, and each client device may be provided with a different VIP address that is mapped to the IP address by the virtual network service.

After receiving a VIP address, the client device may then attempt to send data packets to the particular server by placing the VIP address in the destination address field of the packets. However, the VIP address may result in the data packets being steered to the virtual network service. The virtual network service may then determine that the VIP address maps to the IP address of the particular server, and may further determine that the client device was in fact provided the VIP address, and the virtual network service may perform NAT on the data packets. That is, the virtual network service may translate the VIP address in the destination field of the packets to the IP address of the particular server and send the packets to the particular server. In this way, the destination address of servers may be represented by VIP address that are not actually the IP addresses of the servers, but can be translated using NAT techniques into the correct IP addresses for reaching the servers.

In addition to obfuscating the IP addresses of servers and endpoints to prevent attacks on the servers, the techniques may further allow the virtual network service to track source devices that may be attacking the servers. For instance, the virtual network service may note the source addresses that are using VIP addresses to attempt to reach the servers despite those source devices not being provided the VIP addresses by the virtual network service.

In some instances, the virtual network service may additionally ensure that traffic returning to the client device and from the servers is also protected. That is, the servers may be configured to utilize their IP addresses as source addresses in data packets. In such examples, the virtual network service may also convert the source IP address of the client devices into system VIP addresses that are virtual addresses that map back to the virtual network service. Generally, the virtual network service may map a respective system VIP address to each client device such that the return traffic from the servers can be redirected back to the appropriate client device. So, when servers receive the traffic having source addresses that are system VIP addresses for the virtual network service, the servers may respond with data packets that include the respective system VIP address as a destination address. Once the virtual network service receives the packet, the virtual network service translates the destination address from the system VIP address into the IP address of the appropriate client device. In this way, the virtual network service may also obfuscate client device IP addresses while ensuring that return traffic from the servers reach the correct client device.

In some instances, the virtual network service may additionally provide load balancing services to servers that are intended to received data packets. For example, the virtual network service may associate a number of servers with a singular endpoint (e.g., multiple servers supporting a website) and each server and/or group of servers may be associated with an IP address, while the endpoint itself may be associated with a single VIP address. That is, in some cases, the virtual network service may store a single VIP address for an endpoint that has multiple IP addresses associated with the respective servers that support the endpoint (e.g., the multiple servers that support a website). In some examples, when the virtual network service receives a data packet from a client device, the virtual network service may determine which server to send the data packet to based on load balancing the endpoint system and to optimize performance of the endpoint system. Once the particular server is identified based on improving performance of the endpoint system, the virtual network service may determine the IP address associated with that server and translate the VIP address to the IP address such that the data packet will be sent to the identified server.

In some cases, each server (e.g., the multiple servers that support an endpoint and/or website) may be associated with an individual VIP address and the virtual network service may select which VIP address to provide the client device based on a number of factors. For instance, varying the location of the virtual network and the server to make it appear that they are different servers in different locations make it harder for an attacker to locate both near the client device and near the server. In some cases, privacy regulations, such as general data protection regulation (GDPR) or lawful intercept, may require that the data communications (e.g., data packets) are located in the same geographic region as the user or that the server can be observed for legal purposes. Thus, the virtual network service may provide a client device with a VIP address that corresponds to a server in a same geographic region as the client device and/or user. Alternatively, the user may desire to not access a server that is within a same geographic region as the client device and/or user and the virtual network service may, in that case, provide a VIP address that corresponds to a server in a different geographic region as the client device and/or user. For example, the virtual network service may determine a virtual distance between the client device and each of the VIP addresses and/or servers associated with the VIP addresses (e.g., based on where an IP address is located on ISP information). The virtual network service may generate a table including the virtual distances as well as external factors, such as the privacy requirements for particular regions and/or user preferences. The virtual network service may determine a particular privacy requirement based on a geographic region that the user and/or client device is located and/or user preference and, with that privacy requirement and/or user preference determined and/or otherwise identified, the virtual network service may determine whether the client device should access a VIP address and/or a server associated with the VIP address having a particular virtual distance (e.g., an amount of kilometers) from the client device (e.g., a minimum virtual distance, a maximum virtual distance, etc.). Once the desired virtual distance is determined, the virtual network service may select the associated VIP address and/or a server associated with the VIP address and provide the selected VIP address to the client device.

In some examples, the virtual network service may select a VIP address and/or a server associated with the VIP address based on a power usage associated with accessing the VIP address and/or a server associated with the VIP address. For example, in some cases, more than one VIP address and/or a server associated with the VIP address may have a similar virtual distance from the client device. That is, the virtual distances between multiple VIP addresses and/or server associated with the VIP addresses may be within a threshold degree of similarity. In some examples, in these cases, the VIP address and/or a server associated with the VIP address utilizing the least power usage between client and the VIP address and/or a server associated with the VIP address may be selected. In some cases, the virtual network service and/or a third-party may utilize a Border Gateway Protocol (BGP) for exchanging routing and reachability information among autonomous systems (ASs) on the internet. The virtual network service and/or the third-party service may consider information such as AS paths and locality of the ASs and may build Autonomous System (AS)-to-AS tables to generate and store power usages (e.g., energy costs) between ASs.

In some cases, the virtual network service may rotate the location of the virtual network provided to the client device when multiple networks are available. For example, the virtual network service may initially select a VIP address and/or a server associated with the VIP address having a location which minimizes the cost of the path between the selected VIP address and/or a server associated with the VIP address and the client device. In some cases, the virtual network service may receive another DNS request from a client device that previously was provided a VIP address and after a predetermined period of time the client device may be provided a different VIP address. In this way, it may seem to a bad actor (e.g., an attacker) that the client device is accessing a different server though in fact the selected server could be the same.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram 100 of a virtual network service 102 that maps VIP addresses to IP addresses of endpoints devices such that a DNS server can provide client devices with respective VIP addresses that are usable to reach the endpoint devices.

As illustrated, client devices 104 are able to communicate with DNS 106, which is generally one or more DNS servers that perform DNS operations. The client devices 104 may be any type of computing device that uses DNS to communicate with one or more endpoint devices 110. For instance, the client devices 104 may be personal user devices (e.g., desktop computers, laptop computers, phones, tablets, wearable devices, entertainment devices such as televisions, etc.), network devices (e.g., servers, routers, switches, access points, etc.), and/or any other type of computing devices.

The client devices 104 may communicate with the DNS 106, the virtual network service 102, the endpoint devices 110, and/or any other computing devices over one or more networks 108, such as the Internet. The network(s) 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

At "1," a client device 104 may generate and send a DNS request 112 to the DNS 106. The DNS request 112 may include a request for the DNS 106 to translate a domain name (e.g., "www.acme.com") into an IP address that can be used for sending traffic to the desired website, service, etc., associated with the domain name.

The DNS 106 may receive the DNS request 112 and, at "2," request a VIP address from the virtual network service 102. The DNS 106 may also provide the virtual network service 102 with an indication of the domain name that the client device 104 would like translated into an IP address. In other examples, the DNS 106 may provide the actual IP address to the virtual network service 102 for the desired domain name.

Although illustrated as separate entities that communicate with each other, in some instances the DNS 106 and virtual network service 102 may be the same entity. That is, the DNS 106 may include the virtual network service 102, the virtual network service 102 may include the DNS 106, and so forth. The virtual network service 102 may be a cloud-based security service, a NAT service, and/or any type of platform or system.

The virtual network service 102 may receive the request for the VIP address for the domain name/IP address and at "3" select (e.g., dynamically allocate) a VIP address for the client device. Generally, the virtual network service 102 may map or otherwise assign VIP addresses (e.g., virtual network) to IP addresses of endpoint devices 110. In some examples, the virtual network service 102 may allocate a prefix (e.g., /64 for IPV6, /24 for IPv4) in a geography to protect the addresses of the servers of endpoint device 110 that it serves in that geography. In the case of IPv4, the stat may be indexed by the pair client address+virtual address, so the same virtual address can be used for multiple clients to denote different real servers of endpoint device 110 in some instances. As illustrated, the virtual network service 102 may map the domain name 114 to the server IP address 120 for the service or website, and may then map that server IP address 120 to the virtual IP address 122.

In some instances, the virtual network service 102 may additionally provide load balancing services to servers that are intended to received data packets. For example, the virtual network service 102 may associate a number of servers with a singular endpoint, such as the endpoint devices 110, (e.g., multiple servers supporting a website) and each server and/or group of servers may be associated with an IP address, while the endpoint device 110 itself may be associated with a single VIP address. That is, in some cases, the virtual network service 102 may store a single VIP address for an endpoint device 110 that has multiple IP addresses associated with the respective servers that support the endpoint device 110 (e.g., the multiple servers that support a website). In some examples, when the virtual network service 102 receives a data packet from a client device 104, the virtual network service 102 may determine which server to send the data packet to based on load balancing the endpoint device 110 system and to optimize performance of the endpoint device 110 system. Once the particular server is identified based on improving performance of the endpoint device 110 system, the virtual network service 102 may determine the IP address associated with that server and translate the VIP address to the IP address such that the data packet will be sent to the identified server.

In some cases, each server (e.g., the multiple servers that support an endpoint device 110 and/or website) may be associated with an individual VIP address and the virtual network service 102 may select which VIP address to provide the client device 104 based on a number of factors. For instance, varying the location of the virtual network and the server to make it appear that they are different servers in different locations make it harder for an attacker to locate both near the client device 104 and near the server. In some cases, privacy regulations, such as general data protection regulation (GDPR) or lawful intercept, may require that the data communications (e.g., data packets) are located in the same geographic region as the user or that the server can be observed for legal purposes. Thus, the virtual network service 102 may provide a client device 104 with a VIP address that corresponds to a server in a same geographic region as the client device 104 and/or user. Alternatively, the user may desire to not access a server that is within a same geographic region as the client device 104 and/or user and the virtual network service 102 may, in that case, provide a VIP address that corresponds to a server in a different geographic region as the client device 104 and/or user. For example, the virtual network service 102 may determine a virtual distance between the client device 104 and each of the VIP addresses and/or servers associated with the VIP addresses (e.g., based on where an IP address is located on ISP information). The virtual network service 102 may generate a table including the virtual distances as well as external factors, such as the privacy requirements for particular regions and/or user preferences. The virtual network service 102 may determine a particular privacy requirement based on a geographic region that the user and/or client device 104 is located and/or user preference and, with that privacy requirement and/or user preference determined and/or otherwise identified, the virtual network service 102 may determine whether the client device 104 should access a VIP address and/or a server associated with the VIP address having a particular virtual distance from the client device 104 (e.g., a minimum virtual distance, a maximum virtual distance, etc.). Once the desired virtual distance is determined, the virtual network service 102 may select the associated VIP address and/or a server associated with the VIP address and provide the selected VIP address to the client device 104. In some cases, the virtual network service 102 may store and/or otherwise have access to (e.g., via a third-party resource) a table 136 storing VIP addresses and their associated regions (e.g., geographic regions), distances from client device 104, as well as other types of information (e.g., privacy requirements associated with particular regions). In some cases the virtual network service 102 may reference the table 136 when selecting a VIP address to provide the client device 104 and may utilize the information stored in the database (e.g., region location, distances, privacy information, etc.) to determine which VIP address should be provided to the client device 104.

In some examples, the virtual network service 102 may select a VIP address and/or a server associated with the VIP address based on a power usage associated with accessing the VIP address and/or a server associated with the VIP address. For example, in some cases, more than one VIP address and/or a server associated with the VIP address may have a similar virtual distance from the client device 104. That is, the virtual distances between multiple VIP addresses and/or server associated with the VIP addresses may be within a threshold degree of similarity (e.g., within 1 kilometer (km), 2 km, 3 km, etc.). In some examples, in these cases, the VIP address and/or a server associated with the VIP address utilizing the least power usage between client and the VIP address and/or a server associated with the VIP address may be selected. In some cases, the virtual network service 102 and/or a third-party may utilize a Border Gateway Protocol (BGP) for exchanging routing and reachability information among autonomous systems (ASs) on the internet. The virtual network service 102 and/or the third-party service may consider information such as AS paths and locality of the ASs and may build AS-to-AS tables to generate and store power usages (e.g., energy costs) between ASs. In some examples, data from the AS-to-AS tables and/or the AS-to-AS tales themselves may be incorporated into the table 136.

In some cases, the virtual network service 102 may rotate the location of the virtual network provided to the client device 104 when multiple networks are available. For example, the virtual network service 102 may initially select a VIP address and/or a server associated with the VIP address having a location which minimizes the cost of the path between the selected VIP address and/or a server associated with the VIP address and the client device 104. In some cases, the virtual network service 102 may receive another DNS request from a client device 104 that previously was provided a VIP address and after a predetermined period of time the client device 104 may be provided a different VIP address. In this way, it may seem to a bad actor (e.g., an attacker) that the client device 104 is accessing a different server though in fact the selected server could be the same (e.g., in cases where a single server is associated with multiple different VIP addresses).

At "4," the virtual network service 102 may provide the VIP address to the DNS and/or directly to the client device 104. The VIP address 122 may be provided to the client device 104 in a DNS response 124 such that the client device 104 determines that the VIP address is usable to contact the desired endpoint device 110. Although illustrated as servers, the endpoint devices 110 can generally be any device that a client device 104 would like to contact, including user devices (e.g., laptops, phones, wearable devices, etc.), network devices (e.g., routers, switches, hubs, etc.), and/or any other type of devices that can be contacted over networks 108.

Figure 1B:
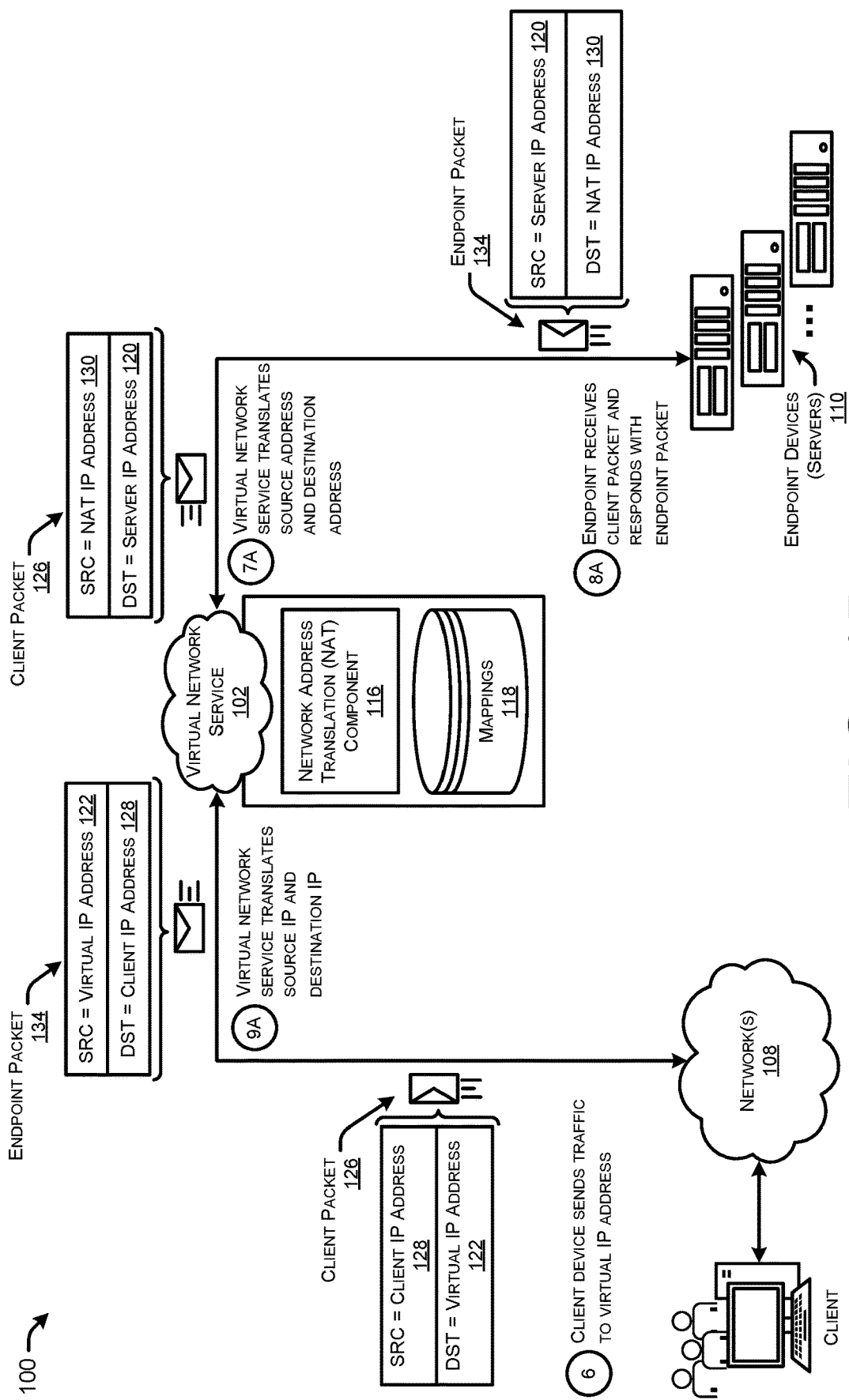
FIG. 1B illustrates a system-architecture diagram of a virtual network service that performs Network Address Translation (NAT) to convert a destination address of packets sent from a client device from a VIP address to an IP address of the endpoint device.

FIG. 1B illustrates a system-architecture diagram 100 of a virtual network service 102 that performs Network Address Translation (NAT) to convert a destination address of packets sent from a client device 104 from a VIP address to an IP address of the endpoint device 110.

At "6," the client device 104 may send traffic including a client packet 126 to the VIP address 122 that was provided in the DNS response 124. The client packet 126 may include the VIP address 122 corresponding to the desired endpoint device 110 as the destination address, and may further include the client IP address 128 of the client device 104 as the source address. Generally, the VIP address 122 may cause the client packet 126 to be communicated to the virtual network service 102 by devices in the network(s) 108.

At "7A," the virtual network service 102 may translate the source address and the destination address of the client packet 126 using NAT techniques. For instance, a NAT component 116 may utilize mappings 118 to determine how to translate or convert the addresses. Specifically, the NAT component 116 may translate the VIP address 122 to the actual service IP address 120 of the server/endpoint device 110 and place the server IP address 120 in the destination address of the client packet 126.

In some instances, the virtual network service 102 may additionally provide load balancing services to servers that are intended to received data packets. For example, the virtual network service 102 may associate a number of servers with a singular endpoint, such as the endpoint devices 110, (e.g., multiple servers supporting a website) and each server and/or group of servers may be associated with an IP address, while the endpoint device 110 itself may be associated with a single VIP address. That is, in some cases, the virtual network service 102 may store a single VIP address for an endpoint device 110 that has multiple IP addresses associated with the respective servers that support the endpoint device 110 (e.g., the multiple servers that support a website). In some examples, when the virtual network service 102 receives the client packet 126 from the client device 104, the virtual network service 102 may determine which server to send the data packet to based on load balancing the endpoint device 110 system and to optimize performance of the endpoint device 110 system. Once the particular server is identified based on improving performance of the endpoint device 110 system, the virtual network service 102 may determine the IP address associated with that server and translate the VIP address to the IP address such that the data packet will be sent to the identified server.

In some examples, optionally, the virtual network service 102 may additionally perform NAT techniques to translate the source address of the client packet 126 such that return traffic from the endpoint devices 110 is sent to the virtual network service 102. For instance, the NAT component 116 may utilize VIP addresses (NAT IP addresses) corresponding to the virtual network service 102 as source addresses such that return traffic is sent to the virtual network service 102. The NAT component 116 may translate the client IP address 128 in the source address field of the packet 126 into a particular NAT IP address 130, and store a mapping 118 between the client device 104 and the NAT IP address 130. In some instances, client devices 104 may have respective NAT IP addresses 130 such that the virtual network service 102 can cause return traffic from the endpoint devices 110 flow back through the virtual network service 102. Thus, the NAT component 116 may translate the source address of the client packet 126 to a NAT IP address 130 that corresponds to the virtual network service 102, and is mapped in the mappings 118 to a client ID of the client device 104 (e.g., the client IP address 128 in some instances).

The client packet 126 is then communicated to the endpoint device 110 corresponding to the server IP address 120 (and the corresponding VIP address 122) indicated in the client packet 126. The endpoint device 110 may, in some examples, determine to respond to the client device 104. The endpoint device 110 may use the source address of the client packet 126 (e.g., the NAT IP address 130) as the destination address in the endpoint packet 134, and the server IP address 132 as the source address. Thus, the endpoint device 110 may send one or more endpoint packets 134 with the NAT IP address 130 as the destination address such that the endpoint packet 134 is sent to the virtual network service 102 at "8A."

The NAT component 116 may, at "9A," translate the source IP address and the destination IP address in the endpoint packet 134. The NAT component 116 may use the mappings 118 to translate the NAT IP address 130 in the destination address field to the client IP address 128 of the client device 104 such that the endpoint packet 134 is sent to the client device 104. Further, the NAT component 116 may use the mappings 118 to translate the server IP address 120 in the source address field to the virtual IP address 122 that is allocated by the virtual network service 102. In this way, any return traffic from the client device 104 may be sent to the VIP address 122 that is the source address of the endpoint packet 134. The endpoint packet 134 may then be sent to the client device 104.

Figure 1C:
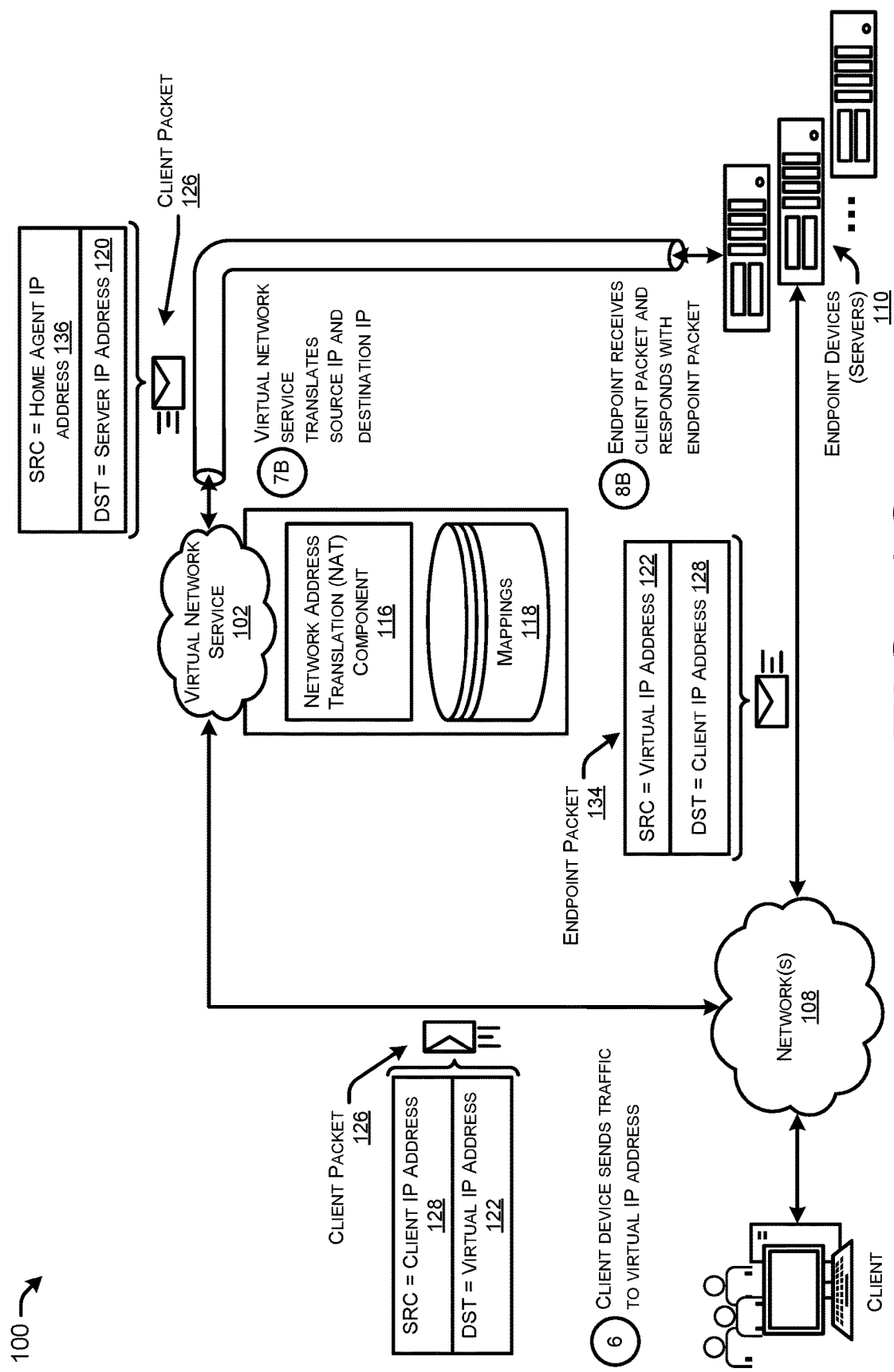
FIG. 1C illustrates a system-architecture diagram of a virtual network service that uses a Home Address option of Mobile IP version 6 (MIPv6) to allow a server to communicate with a home agent of a client device.

FIG. 1C illustrates a system-architecture diagram 100 of a virtual network service 102 that uses a Home Address option of Mobile IP version 6 (MIPv6) to allow a server to communicate with a home agent of a client device.

At "6." the client device 104 may send traffic including a client packet 126 to the VIP address 122 that was provided in the DNS response 124. The client packet 126 may include the VIP address 122 corresponding to the desired endpoint device 110 as the destination address, and may further include the client IP address 128 of the client device 104 as the source address. Generally, the VIP address 122 may cause the client packet 126 to be communicated to the virtual network service 102 by devices in the network(s) 108.

In the example of FIG. 1C, the techniques may be performed according to home agent techniques of Mobile IPV6 defined by Request for Comments (RFC) 6275. The DNS 106 may use a new interface with a HA function where the interface enables the DNS 106 to query the HA function for a virtual address upon a DNS request. The query may contain the client address and the server address that it would have returned by the DNS server without the techniques described herein. In some cases, the HA function may return an address from the /64 in the virtual interface. The end result may be that the set of clients of the virtual network service 102 appear to be located in the same flat subnet, with the effect to hide the topology and the server addresses altogether.

Using that interface, when a new DNS request 112 is made (either by new client 104 or for a different server from a known client 104), one virtual address (serving as home address in mobility management) in the /64 is allocated dynamically by the HA, returned to the DNS 106 and that is the address returned to the client in the DNS response 124. The server address used by a given client may remain constant as long as the client accesses the server without performing a new DNS lookup from a new source address. When the same client performs the same request again, it is usually preferable to return the same address as the first time to keep the sessions going. To that effect, the techniques described herein may include load-balancing the DNS 106 to HA interface based on the client address, or a hash of the client address and the DNS name. This way the same request may served by the same HA server which can return the virtual IP address from an existing state if one is found.

A home agent function (from MIPv6 RFC 6275 or similar mobility protocol) may be associated to the virtual network service 102. That home agent function may tunnel the packet for the virtual address assigned to the server to the real address of the server (used as Care-Of Address in the packet). MIPv6 may use a normal tunnel but alternate (e.g., SRH insertion) and NAT or PAT may be possible. In the case of NAT, the home agent may also NAT the source address to another address it owns, so as to be on path of the traffic back.

In the case of MIPv6, the server of endpoint device 110 may use some Home Address options to talk to the home agent with respect to the particular client device 104. In-band (in the tunnel as an implicit function) or out of band, the home agent may instruct the server of endpoint device 110 to support the home address, e.g., add it to a loop back or store it in the socket information. When it responds, the server of endpoint device 110 responds with that virtual HA IP address. If ingress filtering (e.g., BCP 38, RFC 2827) is enforced, the server may tunnel back to the home agent, using its real address as source. This enables the server of endpoint device 110 to respond without the virtual IP, so any application state and crypto that relies on that address continues to work. In some cases, the stack may absorb the addresses and only present the real server and client addresses to the upper layers, in a fashion similar-though stateless in this case-of host identity protocol (HIP). In the case of IPV4, a NAT function in the cloud service provides the same result, which can be achieved without tunneling.

In some cases, the home agent may be located in the virtual network service 102. Packets to and from the home agent and the server may be tunneled using the Home Address option from the server to the home agent, in which case the source is the server and the destination is the home agent with no encapsulation. To hide the IP address of the server (the Care-of Address in MIPv6 terms), the server of endpoint device 110 may answer to the client device 104 using the home address (e.g., virtual IP address 122) as source and the client IP address 128 as destination. In this example, there is no destination option and no encapsulation.

Figure 2:
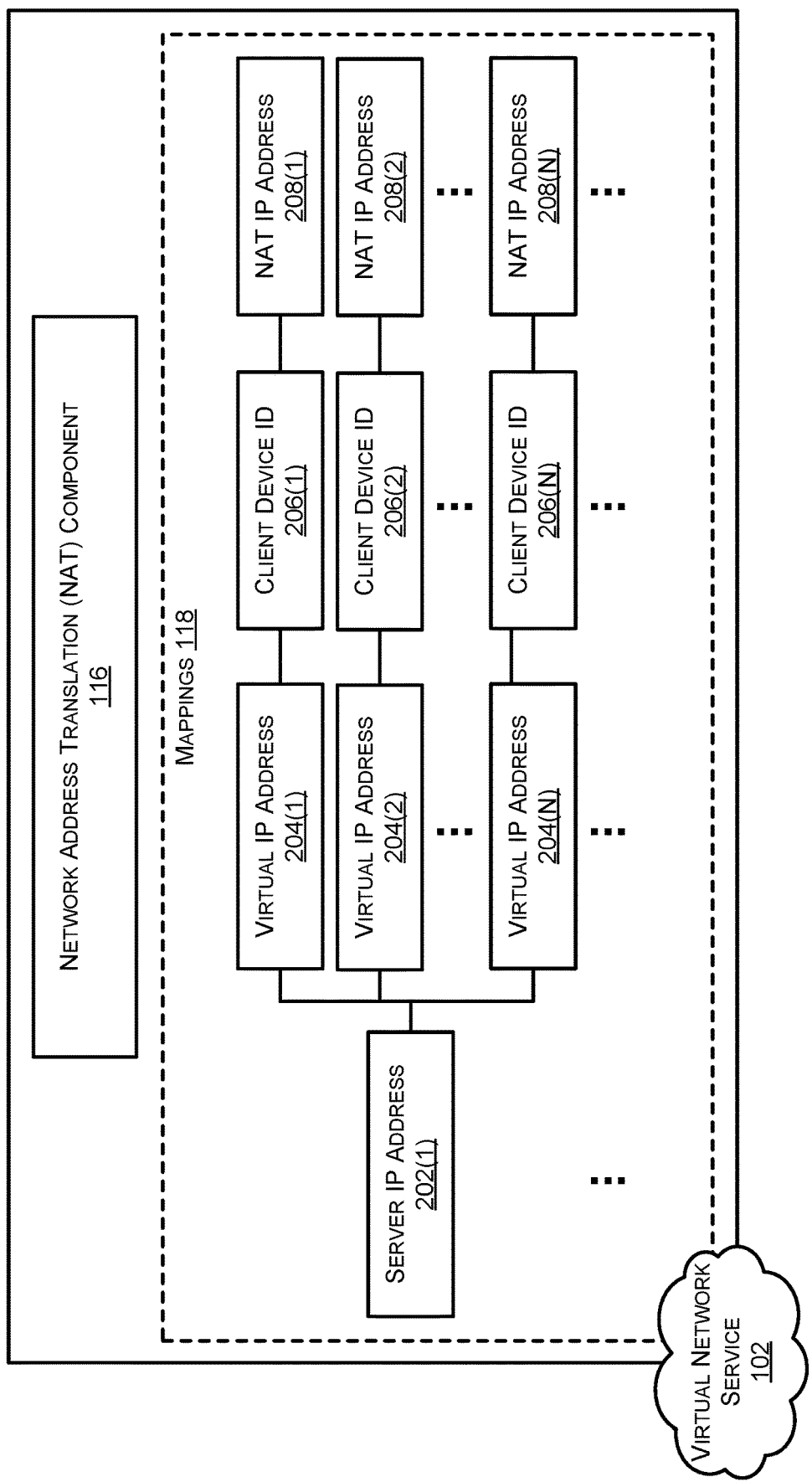
FIG. 2 illustrates example mappings between an IP address of a server, VIP addresses mapped to the IP address, client device identifiers (IDs) mapped to respective VIP addresses, and NAT IP addresses used for respective client devices.
Figure 3A:
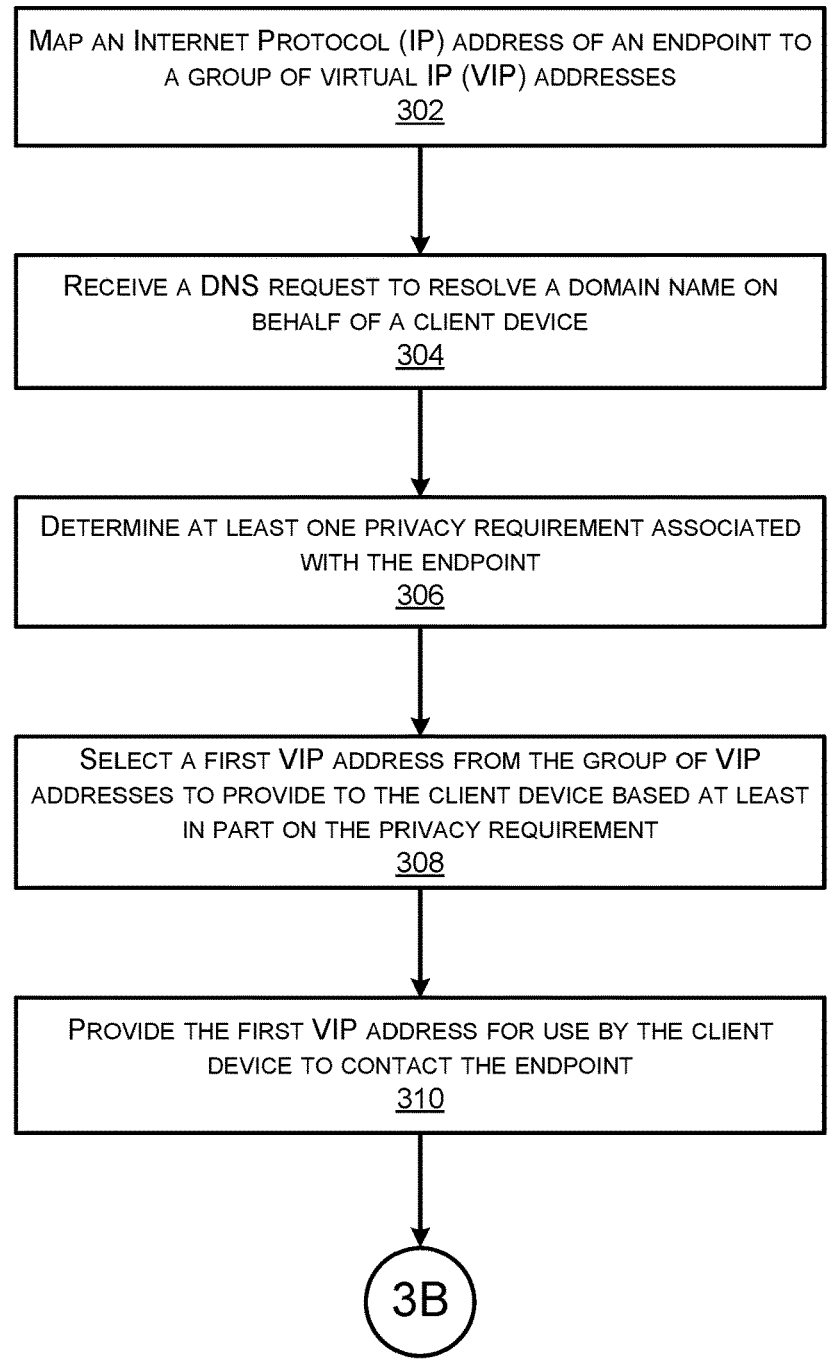
FIGS. 3A and 3B collectively illustrate a flow diagram of an example method for using Network Address Translation (NAT) in conjunction with DNS to select a VIP address to anonymize server-side addresses in data communications.
Figure 3B:
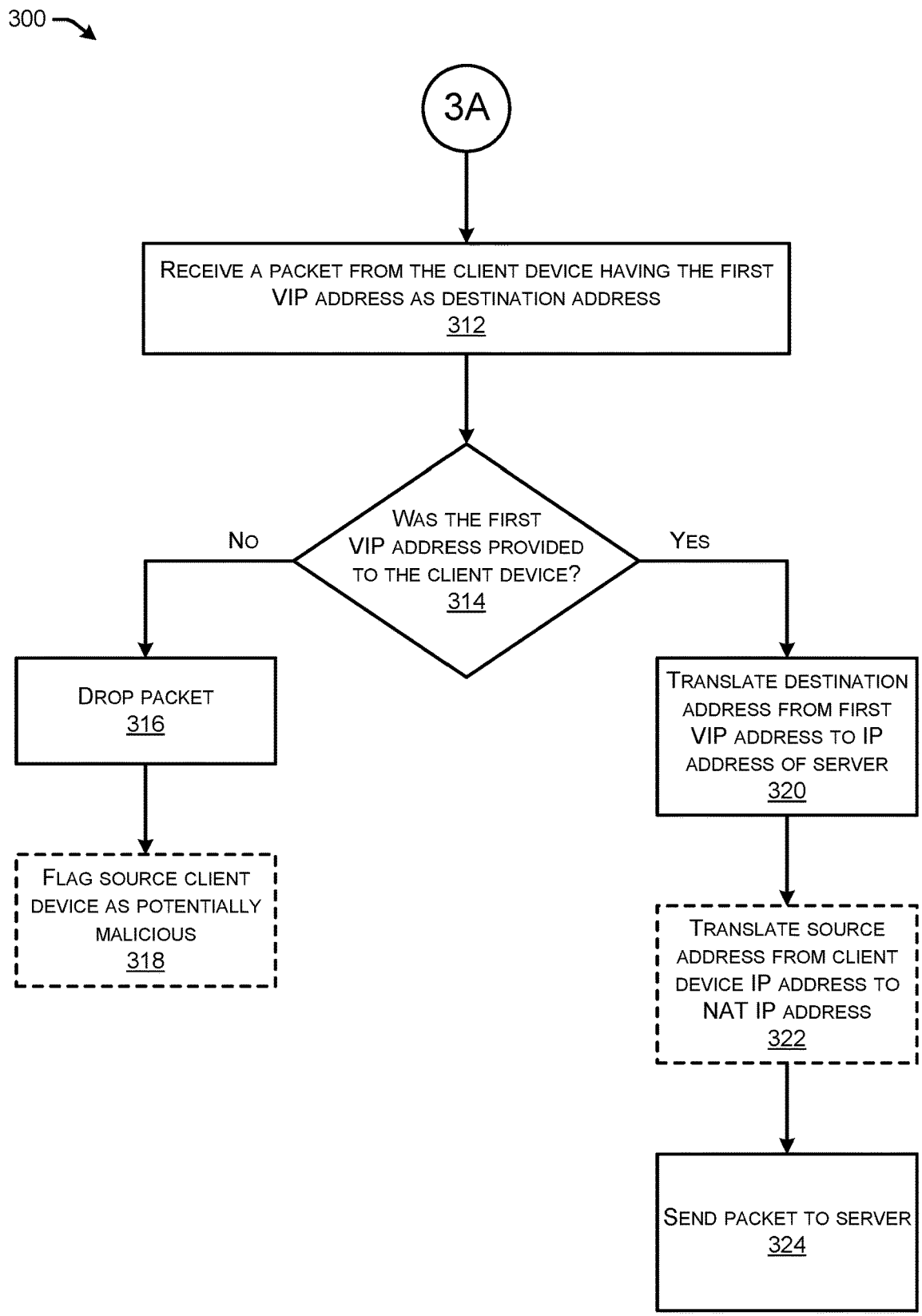

FIG. 2 illustrates example mappings 118 between an IP address of a server, VIP addresses mapped to the IP address, client device identifiers (IDs) mapped to respective VIP addresses, and NAT IP addresses used for respective client devices. As illustrated, the NAT component 116 may store mappings, which may generally be any type of association in memory. Although not illustrated, at least some of the mapping 118 information may be stored at the DNS 106, and/or the DNS 106 may be included in the virtual network service 102.

The NAT component 116 may initially store indications of service IP addresses 202(1)-202(N) (not illustrated). Generally, each endpoint device 110, or server, has at least one actual server IP address 202. Each server IP address 202 may then be mapped to, or allocated, a virtual network of VIP addresses 204(1)-204(N) where "N" is based on the number of client devices 104 that have requested the IP address for the particular server of endpoint device 110.

Each time the NAT component 116 allocates and provides a client device 104 with a VIP address 204, the NAT component 116 may store an association or mapping 118 between the VIP address 204 and a client device ID 206 for that client device 104 (E.g., client IP address in some examples). Thus, each VIP address 204 is associated with a respective client device ID 206. In some instances, the NAT component 116 may further map each client device ID 206 with a respective NAT IP address 208 that is used for ensuring that return traffic from the servers of endpoint device 110 is sent back to the virtual network service 102. By having a NAT IP address 208 mapped to each client device ID 206, when the virtual network service 102 receives traffic back from the endpoint devices 110 that has the destination address as a particular NAT IP address 208, the NAT component 116 may use the mappings 118 to translate the NAT IP address 208 back to a client IP address of the client device 104 and send the packet to the correct client device 104 using the current client IP address.

It should be understood that the mappings 118 are merely illustrative, and other types of mappings 118 or data structures can be used for the NAT techniques described herein.

FIGS. 3A, 3B, 4, and 5 illustrate a flow diagrams of example methods that illustrates aspects of the functions performed at least partly by the devices as described in FIGS. 1A, 1B, 1C, and 2. The logical operations described herein with respect to FIGS. 3A, 3B, 4, and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3A, 3B, 4, and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more FIGS. 3A and 3B collectively illustrate a flow diagram of an example method 300 for using Network Address Translation (NAT) in conjunction with DNS to select a VIP address to anonymize server-side addresses in data communications.

In some examples, the steps of method 300 may be performed, at least partly, by a virtual network service 102, which may include, be included in, or at least be associated with a DNS 106 (e.g., communicatively coupled). The virtual network service 102 may comprise one or more processors and one or more non-transitory computer-readable media storing computer-executable instructions that, when executed by the one or more processors, cause the one or more processors to perform the operations of method 300.

At 302, the virtual network service 102 may map an IP address of an endpoint to a group of VIP addresses. For instance, the NAT component 116 may allocate a virtual network, which may be the group of VIP addresses, for an IP address of a server of endpoint device 110.

At 304, the virtual network service 102 may receiving a DNS request to resolve a domain name on behalf of a client device. For instance, the DNS 106 may receive a DNS request 112 that includes a domain name 114 for a website, service, etc., that the client device 104 is requesting be resolved.

At 306, the virtual network service 102 may determine at least one privacy requirement associated with the endpoint. For instance, the virtual network service and/or DNS may determine which VIP address should be provided based on a number of factors (e.g., power usage, privacy requirements, virtual distances, load balancing, etc.) and provide the selected VIP address mapped to the IP address to each client device, and store a mapping between each VIP address and the client device that received the VIP address.

At 308, the virtual network service 102 may select a first VIP address from the group of VIP addresses to provide to the client device based at least in part on the privacy requirement. For instance, the virtual network service 102 may allocate a unique VIP address 122 for the client device 104, where the VIP address 122 maps to the client device 104 ID in the mappings 118.

At 310, the virtual network service 102 may provide the first VIP address for use by the client device to contact the endpoint. For instance, the virtual network service 102 may provide the VIP address 122 to the DNS 106, which in turn provides the VIP address 122 to the client device 104 in a DNS response 124.

At 312, the virtual network service 102 may receive a packet from the client device that has the first VIP address as the destination address. For instance, the virtual network service 102 may receive a client packet 126 from the client device 104 that includes the VIP address 122 that maps to the server IP address 120 of the endpoint/server of endpoint device 110 that the client device 104 would like to communicate with.

At 314, the virtual network service 102 may determine whether the first VIP address was provided to the client device 314. For instance, the NAT component 116 may check the mappings 118 to see if the VIP address 122 was provided to the client device 104 and is mapped to the client device ID.

In instances where the first VIP address was not provided to the client device (e.g., rogue device), the virtual network service 102 may, at 316 drop the packet because the device is not permitted to use that VIP address. Further, the virtual network service 102 may also flag the source device as potentially malicious at 318 because the source device was using a VIP address that was not provided to it by the virtual network service 102, and it may have been improperly obtained by a malicious observer.

In instances where the first VIP address was provided to the client device 104, the virtual network service 102 may translate the destination address from the first VIP address to an IP address of the server at 310. Further, the virtual network service 102 may, optionally, translate the source address from being the client device IP address 128 to the NAT IP address 130 for return traffic from the server/endpoint device 110. At 324, the virtual network service 102 may then send the client packet 126 to the endpoint device 110.

Figure 4:
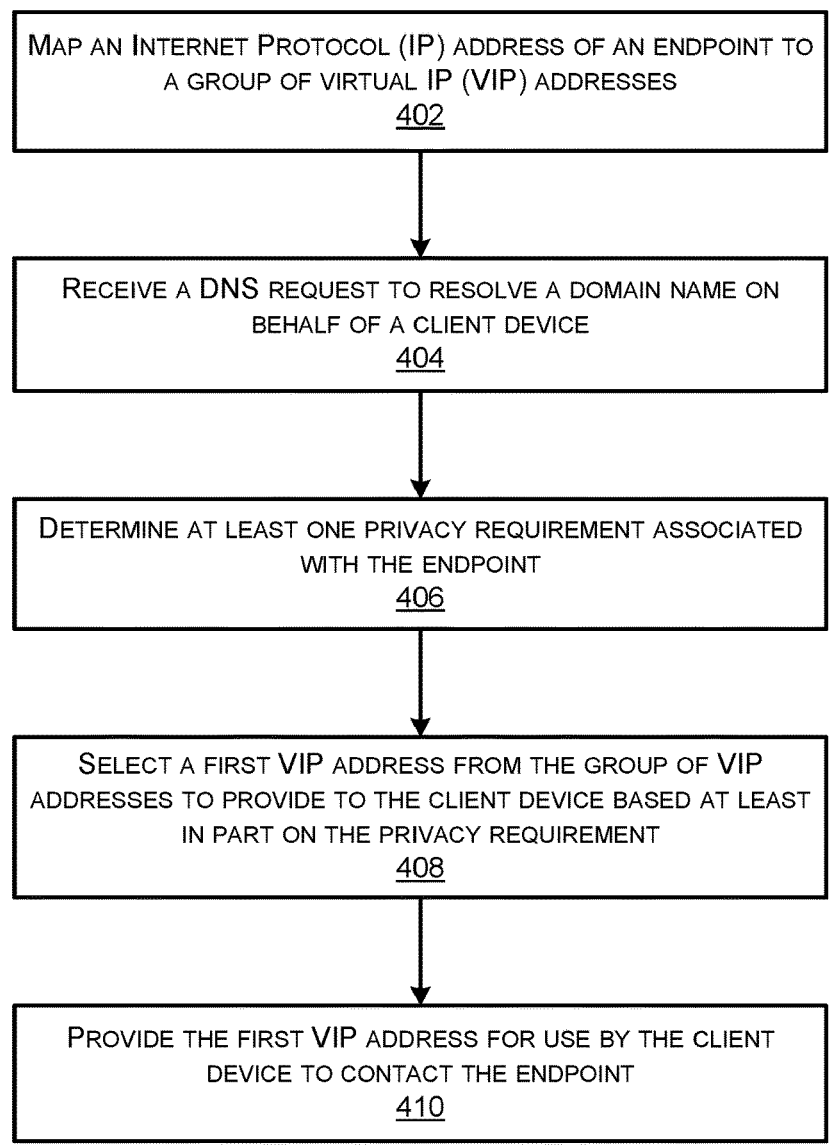
FIG. 4 illustrates another flow diagram of an example method for using Network Address Translation (NAT) in conjunction with DNS to select a VIP address to anonymize server-side addresses in data communications.

FIG. 4 illustrates another flow diagram of an example method 400 for using Network Address Translation (NAT) in conjunction with DNS to select a VIP address to anonymize server-side addresses in data communications.

In some examples, the steps of method 400 may be performed, at least partly, by a virtual network service 102, which may include, be included in, or at least be associated with a DNS 106 (e.g., communicatively coupled). The virtual network service 102 may comprise one or more processors and one or more non-transitory computer-readable media storing computer-executable instructions that, when executed by the one or more processors, cause the one or more processors to perform the operations of method 400.

At 402, the virtual network service 102 may map an IP address of an endpoint to a group of VIP addresses. For instance, the NAT component 116 may allocate a virtual network, which may be the group of VIP addresses, for an IP address of a server of endpoint device 110.

At 404, the virtual network service 102 may receiving a DNS request to resolve a domain name on behalf of a client device. For instance, the DNS 106 may receive a DNS request 112 that includes a domain name 114 for a website, service, etc., that the client device 104 is requesting be resolved.

At 406, the virtual network service 102 may determine a power usage associated with the first VIP address. For instance, the virtual network service and/or DNS may determine which VIP address should be provided based on a number of factors (e.g., power usage, privacy requirements, virtual distances, load balancing, etc.) and provide the selected VIP address mapped to the IP address to each client device, and store a mapping between each VIP address and the client device that received the VIP address.

At 408, the virtual network service 102 may select a first VIP address from the group of VIP addresses to provide to the client device based at least in part on the privacy requirement. For instance, the virtual network service 102 may allocate a unique VIP address 122 for the client device 104, where the VIP address 122 maps to the client device 104 ID in the mappings 118.

At 410, the virtual network service 102 may provide the first VIP address for use by the client device to contact the endpoint. For instance, the virtual network service 102 may provide the VIP address 122 to the DNS 106, which in turn provides the VIP address 122 to the client device 104 in a DNS response 124.

Figure 5:
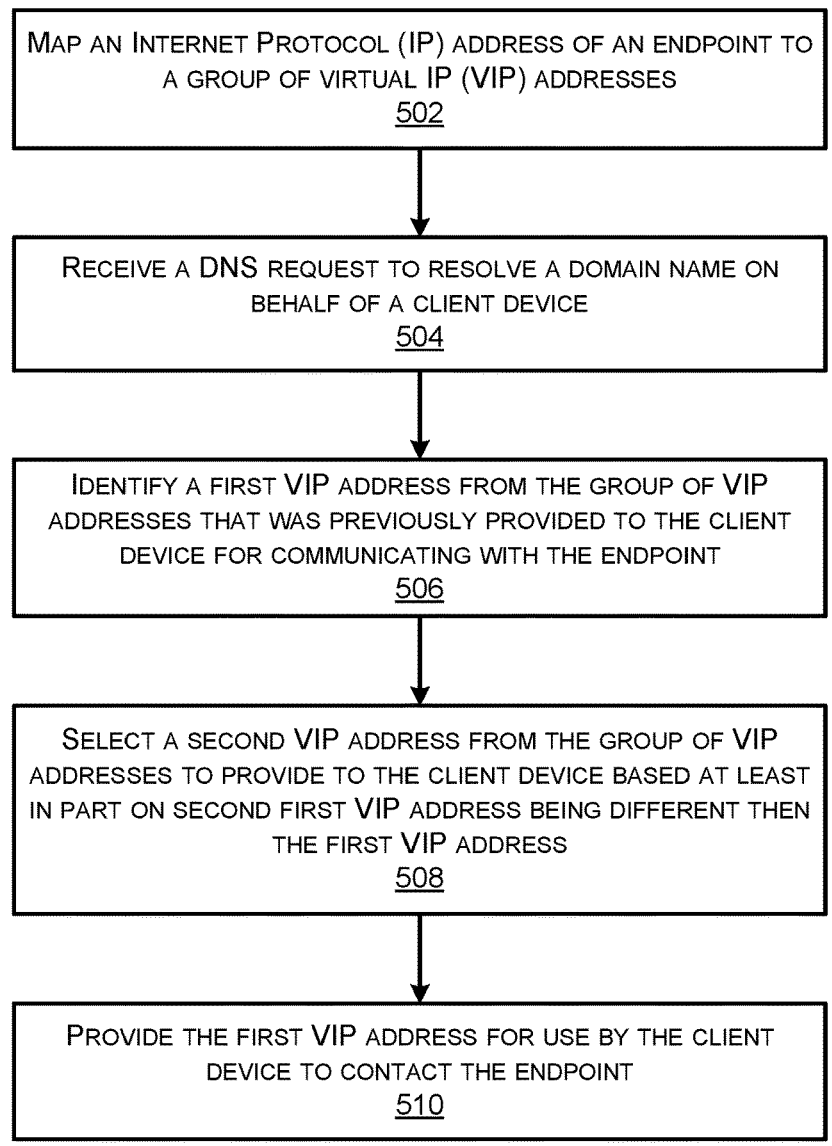
FIG. 5 illustrates another flow diagram of an example method for using Network Address Translation (NAT) in conjunction with DNS to select a VIP address to anonymize server-side addresses in data communications.

FIG. 5 illustrates a flow diagram of an example method 500 for using Network Address Translation (NAT) in conjunction with DNS to select a VIP address to anonymize server-side addresses in data communications.

In some examples, the steps of method 300 may be performed, at least partly, by a virtual network service 102, which may include, be included in, or at least be associated with a DNS 106 (e.g., communicatively coupled). The virtual network service 102 may comprise one or more processors and one or more non-transitory computer-readable media storing computer-executable instructions that, when executed by the one or more processors, cause the one or more processors to perform the operations of method 500.

At 502, the virtual network service 102 may map an IP address of an endpoint to a group of VIP addresses. For instance, the NAT component 116 may allocate a virtual network, which may be the group of VIP addresses, for an IP address of a server of endpoint device 110.

At 504, the virtual network service 102 may receiving a DNS request to resolve a domain name on behalf of a client device. For instance, the DNS 106 may receive a DNS request 112 that includes a domain name 114 for a website, service, etc., that the client device 104 is requesting be resolved.

At 506, the virtual network service 102 may identify a first VIP address from the group of VIP addresses that was previously provided to the client device for communicating with the endpoint. For instance, in some cases, the virtual network service may rotate the location of the virtual network provided to the client device when multiple networks are available. For example, the virtual network service may initially select a VIP address and/or a server associated with the VIP address having a location which minimizes the cost of the path between the selected VIP address and/or a server associated with the VIP address and the client device. In some cases, the virtual network service may receive another DNS request from a client device that previously was provided a VIP address and after a predetermined period of time the client device may be provided a different VIP address. In this way, it may seem to a bad actor (e.g., an attacker) that the client device is accessing a different server though in fact the selected server could be the same.

At 508, the virtual network service 102 may select a second VIP address from the group of VIP addresses to provide to the client device based at least in part on second first VIP address being different then the first VIP address. For instance, the virtual network service 102 may allocate a unique VIP address 122 for the client device 104, where the VIP address 122 maps to the client device 104 ID in the mappings 118.

At 510, the virtual network service 102 may provide the second VIP address for use by the client device to contact the endpoint. For instance, the virtual network service 102 may provide the VIP address 122 to the DNS 106, which in turn provides the VIP address 122 to the client device 104 in a DNS response 124.

Figure 6:
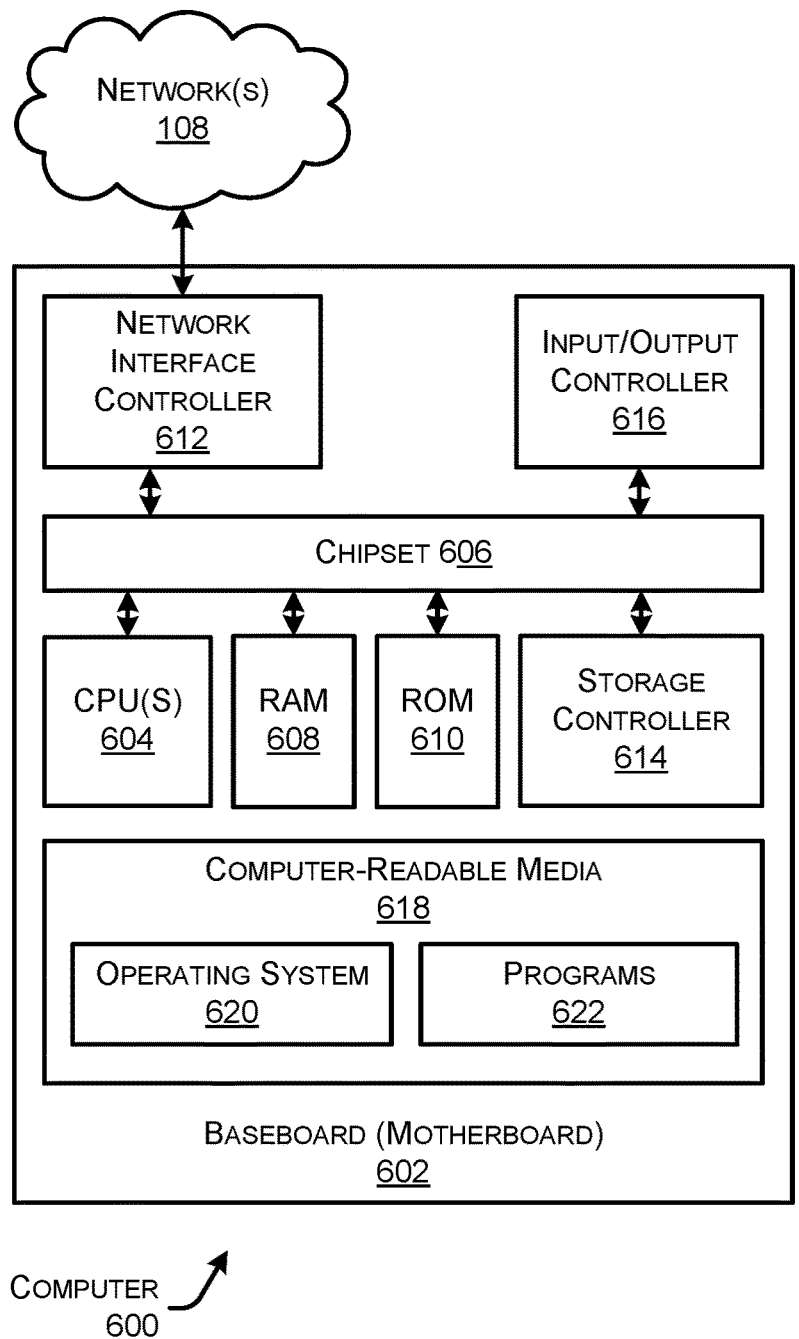
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computer 600 may, in some examples, correspond to a device and/or a system of devices that support the virtual network service 102, the DNS 106, and/or a combination thereof, described herein, and may comprise networked devices such as servers, switches, routers, hubs, bridges, gateways, modems, repeaters, access points, etc. That is, the computer 600, or a system of computers 600, may be configured to perform some or all of the techniques performed by the virtual network service 102, some or all of the techniques performed by the DNS 106, and/or any combination thereof.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 108. The chipset 606 can include functionality for providing network connectivity through a NIC 612, such as a gigabit Ethernet adapter. The NIC 612 is capable of connecting the computer 600 to other computing devices over the network 108. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices in the virtual network service 102, and or any components included therein, may be supported by one or more devices similar to computer 600. Stated otherwise, some or all of the operations performed by the virtual network service 102, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 4, can include other components that are not explicitly shown in FIG. 4, or might utilize an architecture completely different than that shown in FIG. 4.

The computer 600 may include one or more hardware processors (e.g., CPUs 604) (processors) configured to execute one or more stored instructions. The processor(s)

(e.g., CPUs 604) may comprise one or more cores. Further, the computer 600 may include one or more network interfaces configured to provide communications between the computer 600 and other devices, such as the communications described herein as being performed by the virtual network service 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for providing a virtual network service 102 that is capable of anonymizing service-side addresses. That is, the computer 600 may comprise any one of the devices that support the virtual network service 102. The programs 622 may comprise any type of program that cause the computer 600 to perform techniques for communicating with other devices using any type of protocol or standard, and performing NAT and/or DNS, to anonymize server-side addresses.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system associated with a Domain Name System (DNS) service that anonymizes Internet Protocol (IP) addresses of endpoints using groups of virtual IP (VIP) addresses, the system comprising:
   one or more processors; and
   one or more non-transitory computer-readable media storing computer-executable instructions that, when executed by the one or more processors, cause the one or more processors to perform operations comprising:
   mapping an IP address of an endpoint to a group of VIP addresses;
   receiving a DNS request to resolve a domain name on behalf of a client device;
   determining at least one privacy requirement associated with the endpoint;
   selecting a first VIP address from the group of VIP addresses to provide to the client device based at least in part on the at least one privacy requirement; and
   providing the first VIP address for use by the client device to contact the endpoint.

2. The system of claim 1, wherein the at least one privacy requirement is associated with general data protection regulation (GDPR).

3. The system of claim 1, the operations further comprising:
   receiving a packet having a destination address that is the first VIP address;
   determining that a source address of the packet is a source IP address of the client device sent the packet;
   performing Network Address Translation (NAT) by changing the destination address of the packet from the first VIP address to the IP address of the endpoint; and
   sending the packet to a next hop associated with the IP address of the endpoint.

4. The system of claim 1, the operations further comprising:
   determining a first geographic region in which the endpoint is located;
   determining that the first VIP address is associated with the first geographic region; and
   selecting the first VIP address from the group of VIP addresses based at least in part on the first VIP address being associated with the first geographic region.

5. The system of claim 4, the operations further comprising:
   determining a first geographic region in which the endpoint is located;
   determining that the first VIP address is associated with a second geographic region that is different than the first geographic region; and
   selecting the first VIP address from the group of VIP addresses based at least in part on the first VIP address being associated with the second geographic region.

6. The system of claim 1, the operations further comprising:
   determining a first virtual distance between the first VIP address and the client device;
   determining a second virtual distance between a second VIP address and the client device; and
   selecting the first VIP address from the group of VIP addresses based at least in part on the first virtual distance being a greater amount then the second virtual distance.

7. The system of claim 1, the operations further comprising:
   determining a first virtual distance between the first VIP address and the client device;
   determining a second virtual distance between a second VIP address and the client device;
   determining that the first virtual distance and the second virtual distance are within a threshold degree of similarity;
   in response to the first virtual distance and the second virtual distance being within a threshold degree of similarity, determining a first power usage associated with utilizing the first VIP address and a second power usage associated with utilizing the second VIP address; and
   selecting the first VIP address from the group of VIP addresses based at least in part on the first power usage being a less than then the second power usage.

8. The system of claim 7, wherein at least one of the first power usage or the second power usage is determined based at least in part on an Autonomous System (AS)-to-AS table indicating an energy cost between groups of ASs.

9. The system of claim 1, further comprising:
   determining that a second VIP address that was previously provided to the client device for communicating with the endpoint; and selecting the first VIP address from the group of VIP addresses to provide to the client device based at least in part on the first VIP address being different then the second VIP address.

10. The system of claim 1, further comprising:
determining a power usage associated with the first VIP address; and
selecting the first VIP address from the group of VIP addresses to provide to the client device based at least in part on the power usage.

11. A method performed at least partly by a computing system associated with a Domain Name System (DNS) service that anonymizes Internet Protocol (IP) addresses of endpoints using groups of virtual IP (VIP) addresses, the method comprising:
mapping an IP address of an endpoint to a group of VIP addresses;
receiving a DNS request to resolve a domain name on behalf of a client device;
determining a power usage associated with a first VIP address;
selecting a first VIP address from the group of VIP addresses to provide to the client device based at least in part on the power usage; and
providing the first VIP address for use by the client device to contact the endpoint.

12. The method of claim 11, further comprising:
receiving a packet having a destination address that is the first VIP address;
determining that a source address of the packet is a source IP address of the client device sent the packet;
performing Network Address Translation (NAT) by changing the destination address of the packet from the first VIP address to the IP address of the endpoint; and
sending the packet to a next hop associated with the IP address of the endpoint.

13. The method of claim 11, further comprising:
determining a first geographic region in which the endpoint is located;
determining that the first VIP address is associated with the first geographic region; and
selecting the first VIP address from the group of VIP addresses based at least in part on the first VIP address being associated with the first geographic region.

14. The method of claim 13, further comprising:
determining a first geographic region in which the endpoint is located;
determining that the first VIP address is associated with a second geographic region that is different than the first geographic region; and
selecting the first VIP address from the group of VIP addresses based at least in part on the first VIP address being associated with the second geographic region.

15. The method of claim 11, further comprising:
determining a first virtual distance between the first VIP address and the client device;
determining a second virtual distance between a second VIP address and the client device; and
selecting the first VIP address from the group of VIP addresses based at least in part on the first virtual distance being a greater amount then the second virtual distance.

16. The method of claim 11, further comprising:
determining a first virtual distance between the first VIP address and the client device;
determining a second virtual distance between a second VIP address and the client device;
determining that the first virtual distance and the second virtual distance are within a threshold degree of similarity; and
in response to the first virtual distance and the second virtual distance being within a threshold degree of similarity, selecting the first VIP address from the group of VIP addresses based at least in part on the power usage being a less than then a second power usage associated with the second VIP address.

17. One or more non-transitory computer-readable media storing computer executable instructions that, when executed by one or more processors, cause the one or more processors to perform operations comprising:
mapping an IP address of an endpoint to a group of VIP addresses;
receiving a DNS request to resolve a domain name on behalf of a client device;
identifying a first VIP address from the group of VIP addresses that was previously provided to the client device for communicating with the endpoint;
selecting a second VIP address from the group of VIP addresses to provide to the client device based at least in part on second first VIP address being different then the first VIP address; and
providing the second VIP address for use by the client device to contact the endpoint.

18. The one or more non-transitory computer-readable media of claim 17, the operations further comprising:
receiving a packet having a destination address that is the second VIP address;
determining that a source address of the packet is a source IP address of the client device sent the packet;
performing Network Address Translation (NAT) by changing the destination address of the packet from the second VIP address to the IP address of the endpoint; and
sending the packet to a next hop associated with the IP address of the endpoint.

19. The one or more non-transitory computer-readable media of claim 17, the operations further comprising:
determining a first geographic region in which the endpoint is located;
determining that the second VIP address is associated with the first geographic region; and
selecting the second VIP address from the group of VIP addresses based at least in part on the second VIP address being associated with the first geographic region.

20. The one or more non-transitory computer-readable media of claim 19, the operations further comprising:
determining a first geographic region in which the endpoint is located;
determining that the second VIP address is associated with a second geographic region that is different than the first geographic region; and
selecting the second VIP address from the group of VIP addresses based at least in part on the second VIP address being associated with the second geographic region.

* * * * *